July 29, 1952     A. E. MARTIN     2,605,426
INFRA-RED GAS ANALYZING APPARATUS
Filed Oct. 1, 1949
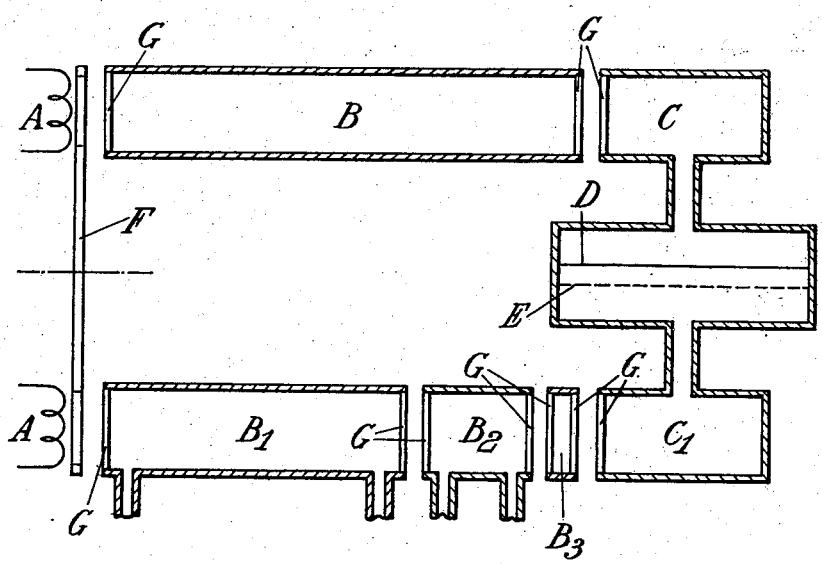
INVENTOR.
ALBERT EDWARD MARTIN
BY
ATTORNEYS.

Patented July 29, 1952

2,605,426

UNITED STATES PATENT OFFICE 2,605,426

INFRA-RED GAS ANALYZING APPARATUS

Albert E. Martin, Newcastle upon Tyne, England, assignor to C. A. Parsons & Company Limited, Newcastle upon Tyne, England Application October 1, 1949, Serial No. 119,038
In Great Britain October 6, 1948

2 Claims. (Cl. 250—43.5)

This invention relates to infra-red gas analysers of the kind wherein radiation from nichrome heaters passes through two gas tubes fitted with transparent windows, into two chambers which are partitioned off by a thin metal diaphragm. The two chambers are filled with the gas to be detected and energy is absorbed as radiation passes through them according to the nature of infrad-red absorption of the gas in question. As the gas heats up an increase of pressure is produced and any difference between the two chambers causes the diaphragm to deform and so give rise to changes of capacity in respect of an insulated perforated metal plate which is fixed in close proximity to the diaphragm.

If both gas tubes contain gas with no infrared absorption and the radiation from the heaters is interrupted by a rotating shutter which admits light simultaneously to the tubes, the pressure pulses in the two chambers will balance and no movement of the diaphragm will result; but if some of the gas to be detected is passed into one of the absorption tubes, energy will be absorbed before it can reach the corresponding detecting chamber. The balance will now be upset and the diaphragm will vibrate at the frequency of interruption of the radiation.

The capacity changes are amplified electronically and finally an indication is obtained on a meter which can be calibrated in gas concentration.

This instrument essentially measures only the particular gas which is contained in the detecting chambers, since other gases will not absorb the wavelengths which are effective in heating the gas in the detecting chambers.

The object of the present invention is greatly to extend the range of the instrument.

The invention consists in brief in an infrared gas analyser of the kind set forth above wherein radiations are passed through a succession of tubes of varying length in place of the single absorption tube usually employed, the particular tube appropriate to the concentration range required being used to contain the sample gas and the other or others being filled with dry $CO_2$ free air or a filtering gas when necessary.

The invention also consists in infra-red gas analysers substantially as described.

The accompanying diagrammatic drawing illustrates an infra-red gas analyser constructed in one form in accordance with the present invention.

In carrying the invention into effect according to one example illustrated in the accompanying drawing, there is provided one long tube B and a second tube separated into three tubes $B_1$, $B_2$, $B_3$ of different lengths. Windows G are furnished which are pervious to radiations emitted by the heaters A. Two nichrome heaters A and a rotary perforated disc F are also provided.

Detector chambers C and $C_1$ define a space which is separated into two portions by a flexible partition D, adjacent to which is positioned an insulated perforated metal plate E, so that the deformation of the diaphragm D in response to pressure changes in the chambers C and $C_1$ will cause changes in the capacity of the diaphragm D with respect to the plate E. These capacity changes may be amplified electronically and finally furnish an indication on a meter calibrated in terms of gas concentration.

If a low concentration of gas is to be measured, the tube B is filled with dry $CO_2$ free air and the gas sample is passed through the tube $B_1$, the other tubes $B_2$ and $B_3$ being filled with dry $CO_2$ free air and sealed off. At higher concentrations the absorption occurring in the pathlength of the tube $B_1$ is so great that saturation is approached and increasing concentration gives less and less extra absorption. At this stage the tube $B_2$ is put into use for the sample gas and tubes $B_1$ and $B_3$ are filled with dry $CO_2$ free air and sealed off. A much higher concentration can now be measured and when the absorption in this tube becomes too great, the shortest tube $B_3$ can be used, the other two tubes $B_1$ and $B_2$ being filled with dry $CO_2$ free air.

The guiding principle is that concentration multiplied by tube length should not exceed a certain value depending on the gas in question, if a reasonably linear calibration curve is required.

Instead of filling the tubes not required for the sample gas with dry $CO_2$ free air, they can be used as filters if desired by filling with the necessary gas at a suitable concentration.

I claim:

1. An infra-red gas analyser comprising a pair of radiation-producing elements, a perforated rotary screen element adjacent thereto, a pair of detecting chambers defining a space separated into two portions by a flexible partition, a window pervious to said radiations in each of said chambers, an insulated perforated metal plate adjacent to said partition, a gas tube furnished with a similarly pervious window at each end interposed between one of said chamber windows and one of said radiation-producing elements with said screen intervening, and a plurality of similar windowed gas chambers of relatively different lengths disposed in line between the other of said chamber windows and the other of said radiation-producing elements with said screen intervening.

2. An infra-red gas analyser as claimed in claim 1 wherein one of said plurality of gas tubes of relatively different lengths is filled with a gas the concentration of which is to be measured and the other or another of said tubes is filled with a gas serving as a filter.

ALBERT E. MARTIN.

REFERENCES CITED

The following references are of record in the file of this patent:

UNITED STATES PATENTS

| Number | Name | Date |
|---|---|---|
| 2,431,019 | Barnes | Nov. 18, 1947 |
| 2,443,427 | Kidder et al. | June 15, 1948 |
| 2,451,572 | Moore | Oct. 19, 1948 |